(12) United States Patent
Bryant

(10) Patent No.: US 8,069,092 B2
(45) Date of Patent: Nov. 29, 2011

(54) METHOD SYSTEM OF SOFTWARE FOR PUBLISHING IMAGES ON A PUBLICLY AVAILABLE WEBSITE AND FOR ORDERING OF GOODS OR SERVICES

(75) Inventor: Steven M. Bryant, Holly, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/903,578

(22) Filed: Oct. 13, 2010

(65) Prior Publication Data

US 2011/0035298 A1 Feb. 10, 2011

Related U.S. Application Data

(62) Division of application No. 10/748,107, filed on Dec. 24, 2003, now Pat. No. 7,860,747.

(51) Int. Cl.
*G06Q 30/00* (2006.01)
(52) U.S. Cl. ...................... 705/26.5; 705/27.1
(58) Field of Classification Search .................. 705/26, 705/27
See application file for complete search history.

(56) References Cited

U.S. PATENT DOCUMENTS

| | | | |
|---|---|---|---|
| 6,058,428 A | 5/2000 | Wang et al. | |
| 6,408,301 B1 | 6/2002 | Patton et al. | |
| 6,657,702 B1 | 12/2003 | Chui et al. | |
| 2002/0065844 A1 | 5/2002 | Robinson et al. | |
| 2002/0087622 A1 | 7/2002 | Anderson | |
| 2002/0091766 A1* | 7/2002 | Shiimori et al. | 709/203 |
| 2002/0197076 A1 | 12/2002 | Manico et al. | |
| 2003/0007200 A1 | 1/2003 | McIntyre | |
| 2003/0090572 A1 | 5/2003 | Belz et al. | |
| 2004/0205494 A1 | 10/2004 | Bernius et al. | |

FOREIGN PATENT DOCUMENTS

| | | |
|---|---|---|
| EP | 1 139 256 | 10/2001 |
| EP | 1 271 915 | 1/2003 |
| JP | 2003141024 | 5/2003 |

* cited by examiner

*Primary Examiner* — Will Allen
*Assistant Examiner* — Resha Desai
(74) *Attorney, Agent, or Firm* — Frank Pincelli; Stephen H. Shaw; Eugene I Shkurko

(57) ABSTRACT

A method and computer software program for publishing images at an accessible website and for ordering goods and/or services to be provided by a fulfillment provider. A high resolution digital image is forwarded from a user to a fulfillment provider that stores the high resolution digital image and associates a unique ID with the high resolution image. The unique ID identifies the storage location of where the high resolution image is stored and the internet address of the fulfillment provider. The user receives the unique ID that is associated with the high resolution image. The user then forwards to an accessible website a low resolution image copy of the high resolution image and the unique ID. The website publishes the low resolution image on the accessible website along with an action button that is associated with the unique ID. Selection of the action button by a viewer causes the viewer being forwarded to the fulfillment provider so that the viewer will to be able to access the high resolution image stored by the fulfillment provider.

11 Claims, 7 Drawing Sheets

ID:IP145RD437

ID:IP145RD438

METHOD SYSTEM OF SOFTWARE FOR PUBLISHING IMAGES ON A PUBLICLY AVAILABLE WEBSITE AND FOR ORDERING OF GOODS OR SERVICES

CROSS-REFERENCE TO RELATED APPLICATIONS

This is a Divisional of Prior U.S. patent application Ser. No. 10/748,107 filed Oct. 24, 2003, now U.S. Pat. No. 7,860,747 now allowed, which is hereby incorporated herein by reference in its entirety.

FIELD OF THE INVENTION

The present invention relates to a method, system, and software for publishing images on a web page and for ordering goods or services to be provided by a fulfillment provider with respect to the images being displayed on a web page.

BACKGROUND OF THE INVENTION

Recently there has become a high interest in blogging. Blogging is basically an on-line diary (often referred to as web log or blog) published on a web page that are generally open to the public for viewing. There are a number of tools that help individuals create web logs and hosting sites for making the web logs available on-line. The web log is typically an HTML web page that includes text and images entered in a chronological order in a manner similar to that of a diary. Typically, these web logs represent the "daily" activity for individuals.

These web logs/blogs are read by many individuals, including family and friends. Often when images are presented, it is desirable for the viewing individual to obtain a print or other image related product with respect to the image being viewed. However, the images available on web logs are typically limited to low resolution images and there is no easy way to obtain the original high resolution image for use in ordering image products. While one may go to the original source of the image, i.e., the person that owns the web log, it is often not desirable to allow someone direct access to the image on their personal computer. Typically, the hosting site that allows the placement of the blog does not want to be bothered with maintaining large files that include a large number of high resolution images.

The present invention is designed to solving many of the problems allowing a mechanism for allowing viewers to easily obtain access to the high resolution images for ordering various goods or services that require access to the high resolution image.

SUMMARY OF THE INVENTION

In accordance with one aspect of the present invention there is provided a method for publishing images at an accessible website and for ordering goods and/or services to be provided by a fulfillment provider with respect to images stored at the fulfillment provider, comprising the steps of:

the fulfillment provider receiving a high resolution digital image from a user device over a communication network;

the fulfillment provider storing the high resolution digital image and associates a unique ID with the high resolution image, the unique ID identifying the storage location of where the high resolution image is stored and provides information as to the interne address of the fulfillment provider;

forwarding the unique ID to the user computer;

the accessible website receiving from the user device a low resolution image copy of the high resolution image and the unique ID;

the website publishing the low resolution image on an accessible website along with an action button that is associated with the unique ID;

forwarding a viewer of the website to the fulfillment provider when the action button is selected by the viewer so that the viewer will be able to place an order directly with the fulfillment provider for ordering goods and/or services with respect to the high resolution image stored by the fulfillment provider.

In accordance with another aspect of the present invention, there is provided a computer software program for publishing images at an accessible website and for ordering goods and/or services to be provided by a fulfillment provider with respect to images stored at the fulfillment provider, the software program, when loaded on to a user computer, will cause the following steps to occur:

forwarding a high resolution digital image from a user device over a communication network to the fulfillment provider, the fulfillment provider storing the high resolution digital image and associates a unique ID with the high resolution image, the unique ID identifying the storage location of where the high resolution image is stored and the internet address of the fulfillment provider;

receiving from the fulfillment provider the unique ID associated with the high resolution image; and forwarding to the accessible website from the user device a low resolution image copy of the high resolution image and the unique ID, the website publishing the low resolution image on an accessible website along with an action button that is associated with the unique ID, selection of the action button by a viewer causes the viewer being forwarded to the fulfillment so that the viewer will to be able to place an order directly with the fulfillment provider for ordering goods and/or services with respect to the high resolution image stored by the fulfillment provider.

In accordance with yet another aspect of the present invention, there is provided a method for publishing images at an accessible website and for ordering goods and/or services to be provided by a fulfillment provider with respect to images stored at the fulfillment provider, comprising the steps of forwarding to the accessible website receiving from the user device a low resolution image copy of the high resolution image and a unique ID, the unique ID identifying the storage location of where a high resolution image of the low resolution is stored and provides information as to the internet address of the fulfillment provider;

the website publishing the low resolution image on an accessible website along with an action button that is associated with the unique ID;

forwarding a viewer of the website to the fulfillment provider when the action button is selected by the viewer so that the viewer will to be able to place an order directly with the fulfillment provider for ordering goods and/or services with respect to the high resolution image stored by the fulfillment provider.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
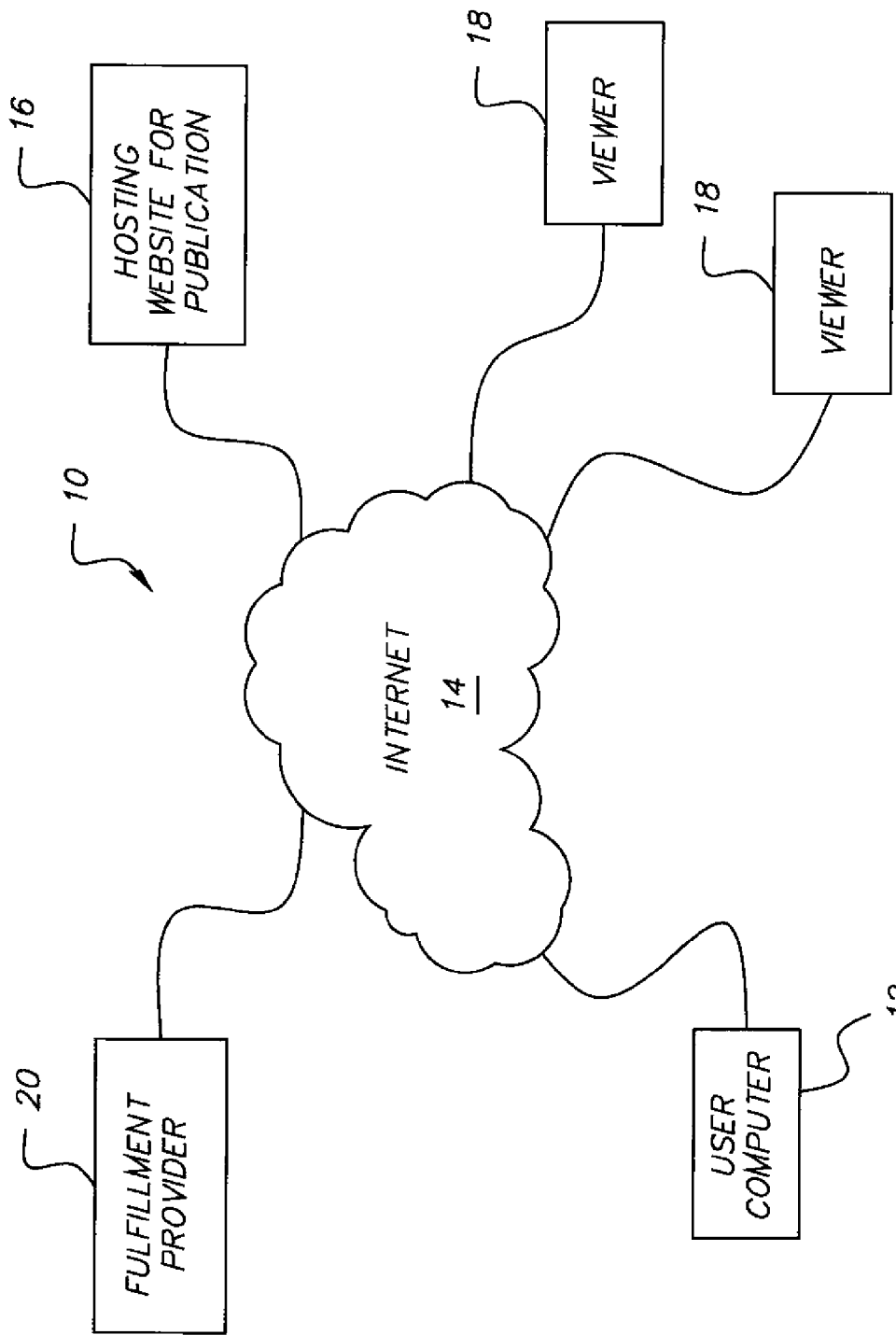
FIG. 1 illustrates a system for practicing the method of publishing image according to the present invention.

Referring to FIG. 1, it is illustrated a system 10 for operating a method in accordance with the present invention. In particular, the system 10 includes a user computer 12 capable of communicating over a communication network 14, such as the Internet, with a hosting website 16 designed for publishing web logs for one or more users. In the particular embodiment illustrated, the website 16 is capable of publishing many web pages on behalf of many users which can be updated as often and as frequently as the user using a computer 12 may desire. The system 10 allows a number of viewing devices 18 which can communicate with the website 16 over communication network 14 to view the web logs of the users at website. In the embodiment illustrated, the devices 18 typically are personal computers. However, the viewing devices 18 may be any other device that can access the web logs, for example a cell phone having a visual display or a PDA (personal digital assistant) that has communication capabilities. The system 10 further includes a fulfillment/image service provider 20 that provides fulfillment services with respect to images stored thereon. An example of the fulfillment/image provider is Ofoto.com website wherein users may store digital images and allow third parties to access images for sharing and/or for ordering of image related goods or services.

Figure 2:
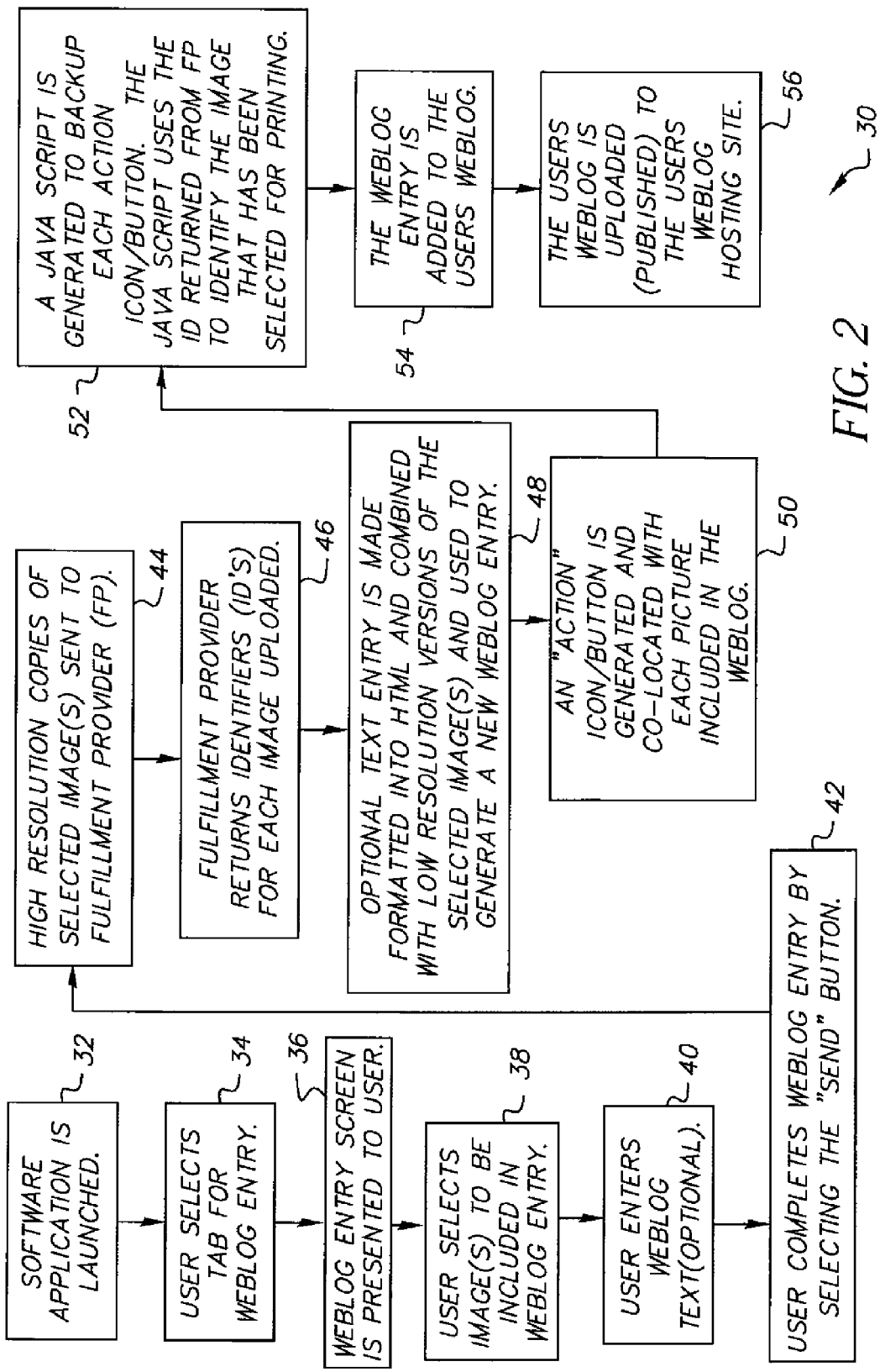
FIG. 2 is a flowchart illustrating how a low resolution copy of an image may be published on an accessible website which allow easy controlled access to the high resolution image from which the low resolution was obtained.
Figure 4:
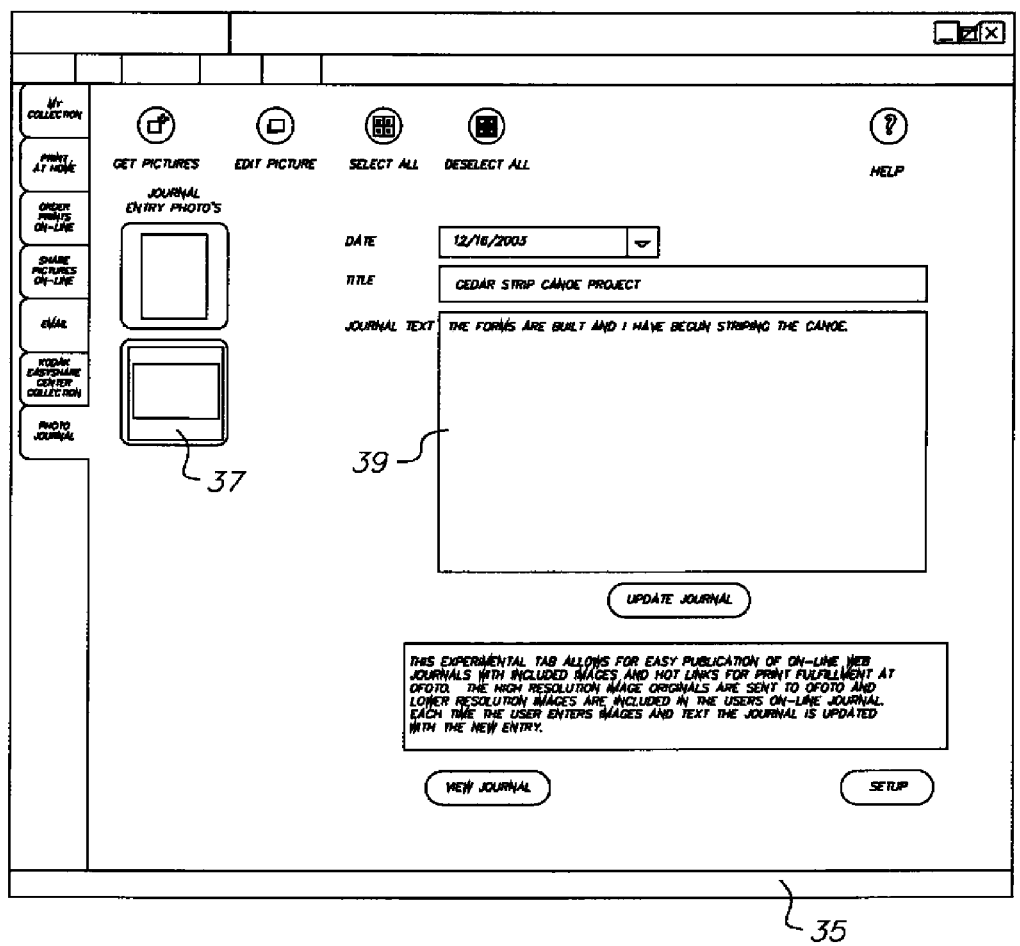
FIG. 4 is a screen shot of a computer display device illustrating the initial steps for a user for uploading the high resolution to an image provider for storing of the high resolution image that corresponds to a low resolution copy that is to be published on website.

Referring to FIG. 2, there is illustrated a flow diagram 30 illustrating how a user using user computer 12 is able to upload high resolution images to the fulfillment provider 20 which is later accessible through the website 16 by various viewers using viewer devices 18. The first step 32 in the process is for the user to activate a software application on user computer 12 that starts the process. At step 32, the user selects a tab (not shown) for beginning of the web log entry for website 16. At step 36, a web log entry screen is displayed on user computer 12. An example of an entry screen is illustrated by FIG. 4. In the particular embodiment illustrated, the entrance to screen 37 includes a first selection area 37 where the users select an image or images that will be placed at a later point in time at the web log belonging or controlled by the user. At the next step 40, the user optionally provides text in section 39 to be associated with each of the selected images.

Figure 5:
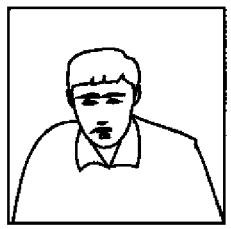
FIG. 5 is a screen shot of a display device similar to FIG. 4 illustrating information that is sent back from the image provider to the user identifying low resolution copy of the high resolution image uploaded and an associated ID for the use in locating of the high resolution image stored at the image provider.
Figure 5:
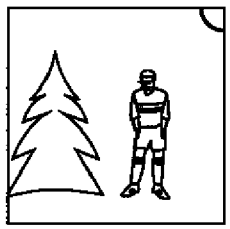

Once the user has completed all the image selections and entries of text, the user at step 40 selects the "Send" selection button 41 whereby the high resolution copies of the selected images are uploaded to the fulfillment provider 20 for storage on an appropriate memory device at step 44. At step 46, the fulfillment provider returns to the user computer 12 a unique identifier (ID) for each of the images uploaded. The ID identifies the location where the high resolution copy of the selected image is stored and also provides information as to the internet address of the fulfillment provider. FIG. 5 illustrates a screen shot 45 on one way in which the information is returned to the user. In particular, low resolution images 47, 49, of the high resolution image that been uploaded are displayed along with their associated ID 51, 53, respectively. These low resolution images and associated Ids are stored on the user computer and are used in constructing of the web log.

At step 48, any text that has been entered by the user on the user computer is appropriately formatted into an HTML format for display at the website 16. Software on the user computer 12 generates the desired low resolution copies of the user selected images for use in generating a new web log entry at the website 16. At step 50, the software on the user computer 12 generates an action icon that is to be co-positioned with each image. The action icon for each image includes the associated ID such that the action icon, when selected by a viewer, will automatically send the viewer to the fulfillment provider site and provide the appropriate information for identifying the particular associated high resolution image associated with the low resolution copy on the web log once the user has completed the selection of image and text, the appropriate low resolution images, associated ID, associated text information, and other appropriate information is forwarded to the website for publication. The low resolution images forwarded may be in any appropriate format, for example, but not limited to JPEG format (including JPEG 2000).

Figure 6:
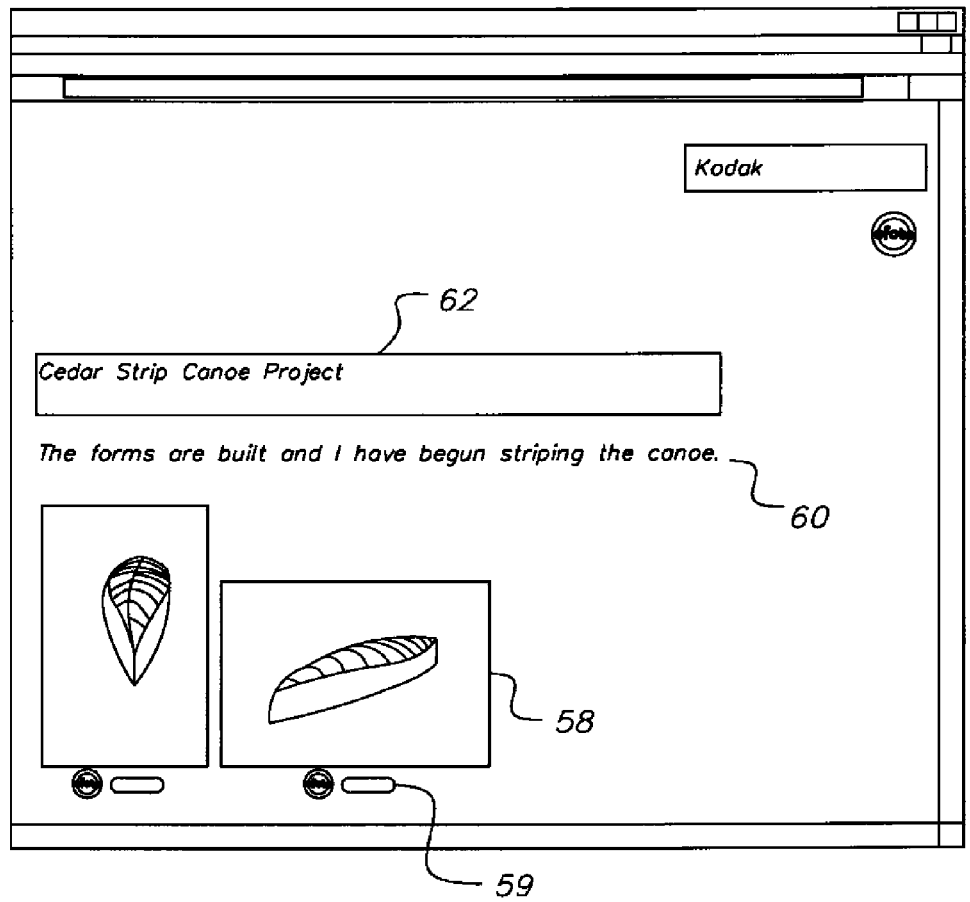
FIG. 6 is a screen shot of a computer display device illustrating a sample web page of a blogging website of a user.
Figure 7:
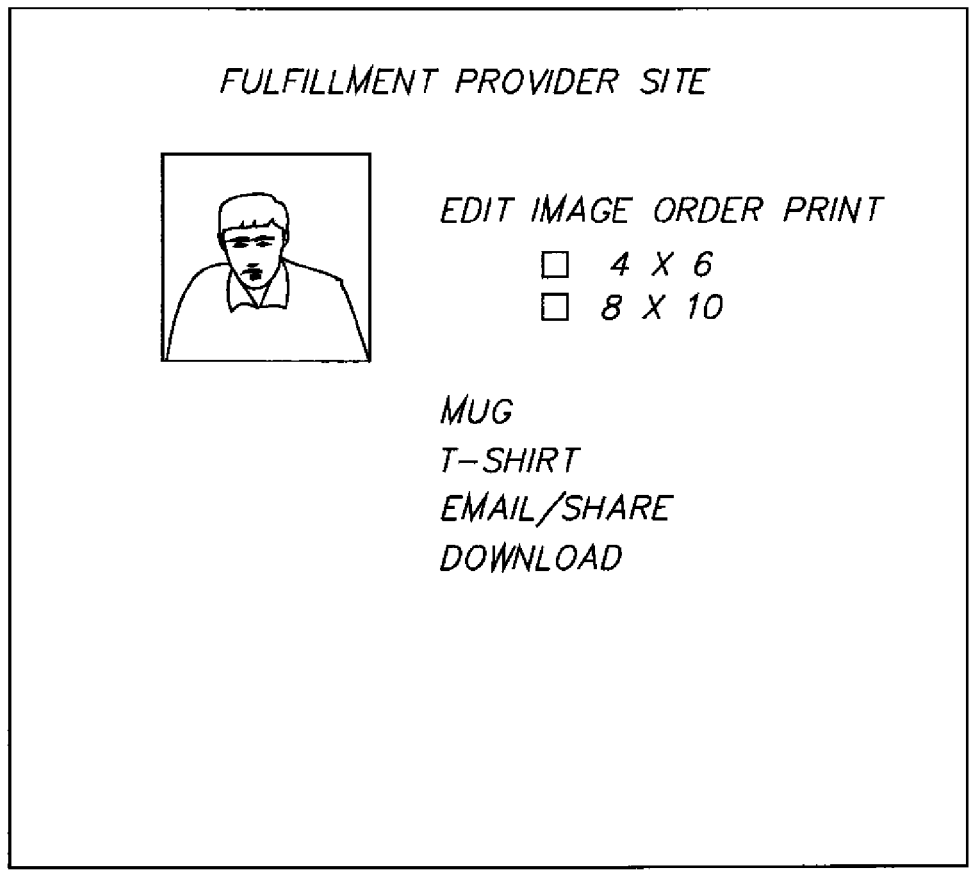
FIG. 7 illustrates a screen shot that a viewer would see after having selected one of the low resolution images on the blog website for obtaining access to the high resolution image for ordering of image related goods and/or services.

Referring to FIG. 6, there is illustrated a screen shot of the user blog at website illustrating the incorporation of a low resolution image 58 and its associated action button 59. In the embodiment illustrated, the hosting website is a publicly accessible website. The hosting website may, if desirable, be of a limited publication limited to a particular group of authorized individuals. It is of course to be understood the blog may have as many different images and text 60, 62, 63 as desired. In the embodiment illustrated, the web log is provided in a diary format allowing daily or otherwise periodic entries. By activation/selection of the action button 59, the viewer would be automatically taken to a screen such as illustrated in FIG. 7 of fulfillment provider 20 which could again show a low resolution copy 64 of the stored high resolution image that has been previously stored. Appropriate actions for ordering prints and various other image products are illustrated by action text or icons 65, 66, 67, 68 for ordering prints and/or various other goods. In the particular embodiment, the action text or icons includes the editing of the image, the ordering of prints, the order of mugs with images, and T-shirts. However, it is to be understood that the various options available to the viewer at this point may be anything as dictated by the fulfillment provider 20, for example, but not limited to e-mailing, sharing and down loading of the high resolution image.

Figure 3:
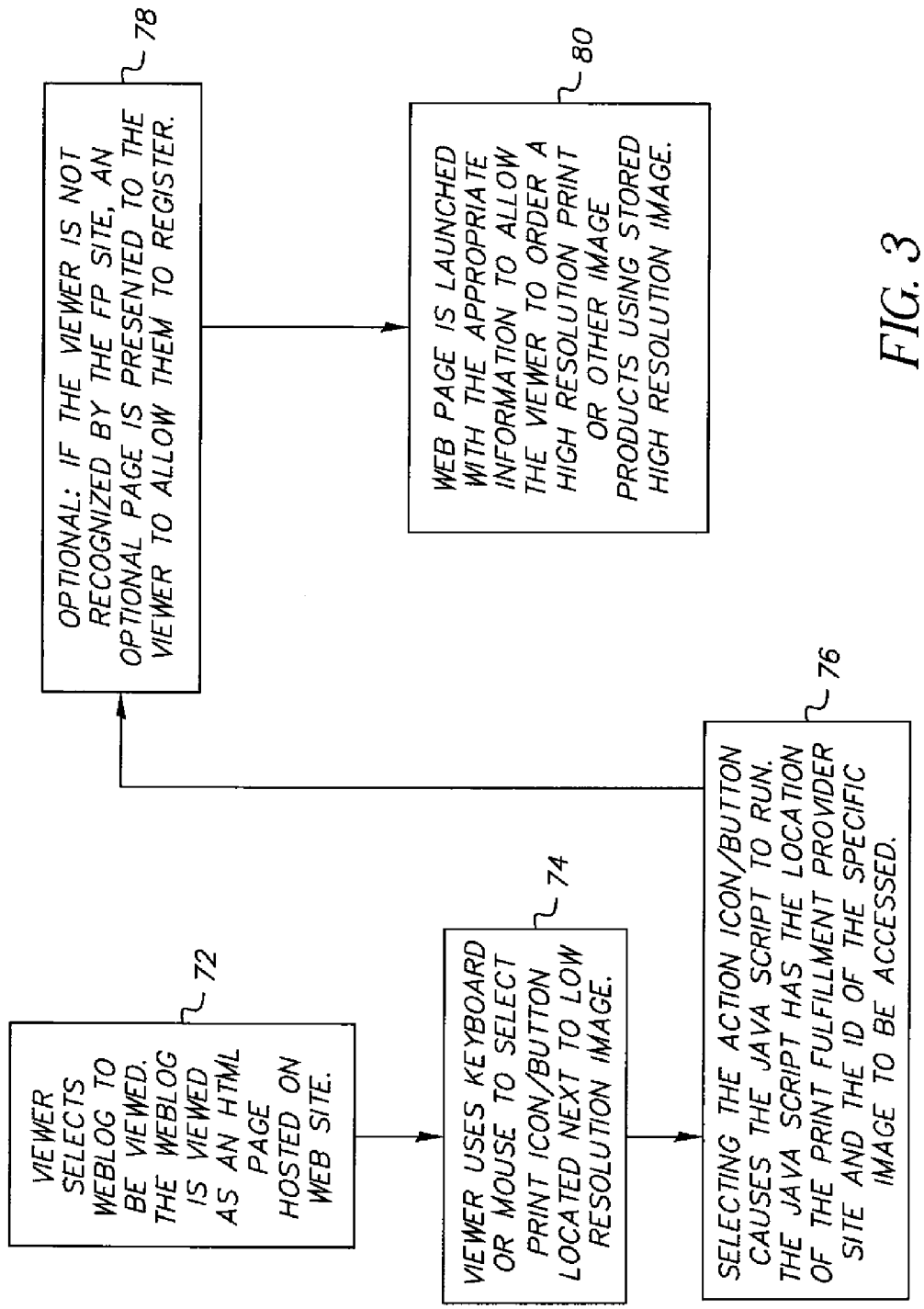
FIG. 3 is a flow diagram illustrating how a viewer can obtain access to the high resolution image that corresponds to the low resolution image being displayed on the publicly accessible website.

Referring to FIG. 3, there is a flow diagram illustrating how a viewer would use the web site for having access or gaining access to the high resolution images stored at the fulfillment provider 20. The first step 72 is that the viewer accesses the website over the internet 14 and selects the web log to be viewed. The next step 74, the viewer, using the appropriate controls on the viewing device 18 (such as keyboard or mouse), selects the action button located next to the low resolution image. At step 76, the selection of the action button causes the Java script associated with the action button to determine the location of the fulfillment site and provide the associated ID for locating of the image such that the appropriate ordering information will be displayed at the fulfillment site that can readily be associated with the high resolution image as needed. An optional step 78, may be provided for the fulfillment site when the fulfillment site does not recognize the viewer, in which case an optional entry log page is provided to allow the viewer to register with the site. At step 80, the appropriate screen is launched with the appropriate information to the viewer to allow the viewer to immediately order image products with respect to the selected image. In an alternate embodiment, the selection of the action button can result in a hard copy print or other image product being automatically ordered by the viewer. In some cases the viewer will need to provide sufficient information so the image product can be delivered to the appropriate location and payment made as required.

In the particular embodiment illustrated, the hosting website 16 is shown as a separate site from the fulfillment provider. It is to be understood that if desired, the website 16 and fulfillment provider may be one in the same.

In the embodiments described above, the image is uploaded by the user computer. It is envisioned that an image capture device, such as a digital camera along with software on the user computer, can automate the process of adding images to the website 16. For example, images captured on a digital camera may be tagged for placement on the website. When the digital camera is linked to the user computer 12, the software on the computer can automatically upload the high resolution image to the fulfillment provider 14 and an associated ID can be obtained for the newly tagged image. Then the software on the user computer 12 can than send this information directly to the hosting website 16 for publication as previously discussed along with the appropriate unique ID. The tagging of the image on the digital camera triggers the appropriate actions needed to publish the low resolution image in the user's web log. The user could additionally be prompted for any text entries to be sent with the image or images added to the web log.

It is to be understood that various other changes and modifications may be made without departing from the scope of the present invention. The present invention being limited by the claims that follow.

PARTS LIST 10 system
12 computer
14 network
16 website
18 viewing devices
20 service provider
30 flow diagram
32 step
36 step
37 screen
40 step
41 selection button
44 step
45 screen shot
46 step
47 low resolution images
48 step
49 low resolution images
50 step
51 ID
53 ID
58 low resolution images
59 action button
60 text
62 text
63 text
64 low resolution copy
65 icons
66 icons
67 icons
68 icons
72 step
74 step
76 step
78 step
80 step

The invention claimed is:

1. A method for providing image goods and/or services over a communication network, comprising the steps of:
    providing a hosting website coupled to the communication network;
    receiving at the hosting website a low resolution digital copy, sent over the communication network by a user device, of a high resolution digital image, the low resolution digital copy including an unique ID, the unique ID associated with both a network connected fulfillment provider's network address on the communication network and with a storage location on a storage device at the fulfillment provider that contains the high resolution digital image; and
    providing an action button on the hosting website that is associated with the fulfillment provider's network address and with the storage location, and that, when activated by a viewing device coupled to the network and accessing the hosting website, provides to the viewing device an order screen from the fulfillment provider, the order screen for placing an order over the communication network directly with said fulfillment provider for goods and/or services with respect to said high resolution digital image stored on a storage device at the fulfillment provider.

2. A method according to claim 1 wherein said accessible website and fulfillment provider are the same site.

3. A program storage device readable by a computer, tangibly embodying a nontransitory software executable by the computer to perform method steps, said method steps comprising:
    forwarding a high resolution digital image from a user device over a communication network to said fulfillment provider, said fulfillment provider storing said high resolution digital image and associating a unique ID with said high resolution image, said unique ID identifying the storage location of where said high resolution image is stored and the internet address of said fulfillment provider;
    receiving from said fulfillment provider said unique ID associated with said high resolution image; and
    forwarding to said accessible website from said user device a low resolution image copy of said high resolution image and said unique ID, said website publishing said low resolution image on an accessible website along with an action button that is associated with said unique ID, selection of said action button by a viewer causes said viewer being forwarded to said fulfillment so that the viewer will to be able to place an order directly with said fulfillment provider for ordering goods and/or services with respect to said high resolution image stored by said fulfillment provider.

4. The storage device according to claim 3 wherein the service being provided by said service provider comprises printing, e-mailing, sharing or obtaining the high resolution copy of said image.

5. The storage device according to claim 3 wherein said selection of said selection button automatically results in obtaining a hard copy print that uses the high resolution image stored at the fulfillment provider.

6. The storage device according to claim 3 wherein said accessible website and fulfillment provider are the same site.

7. The storage device according to claim 3 wherein said one or more images are published at said accessible website in an HTML format.

8. The storage device according to claim 3 wherein said image is provided to said website and said service provider in a JPEG (including jpeg 2000) format.

9. The storage device according to claim 3 wherein said image is displayed at said publicly accessible website in a diary format.

10. The storage device according to claim 3 wherein a capture device automatically identifies a digital image for automatic transfer to said accessible website and fulfillment provider.

11. The storage device according to claim 10 wherein said identification comprises a voice activated command with respect to said capture device.

* * * * *